United States Patent
Jang et al.

(10) Patent No.: US 8,143,917 B2
(45) Date of Patent: Mar. 27, 2012

(54) TRANSCEIVER FOR CONTROLLING SWING WIDTH OF OUTPUT VOLTAGE

(75) Inventors: Young-Chan Jang, Yongin-si (KR); Kyoung-Su Lee, Yongin-si (KR); Hun-Dae Choi, Seoul (KR)

(73) Assignee: Samsung Electronics Co., Ltd., Suwon-Si, Gyeonggi-Do (KR)

( * ) Notice: Subject to any disclaimer, the term of this patent is extended or adjusted under 35 U.S.C. 154(b) by 0 days.

(21) Appl. No.: 12/683,322

(22) Filed: Jan. 6, 2010

(65) Prior Publication Data
US 2011/0001463 A1 Jan. 6, 2011

(30) Foreign Application Priority Data
Jul. 6, 2009 (KR) .................. 10-2009-0061142

(51) Int. Cl.
*H03K 19/094* (2006.01)
*H03L 5/00* (2006.01)
(52) U.S. Cl. .............................. 326/68; 326/86; 327/333
(58) Field of Classification Search .................... 326/68, 326/82, 83, 86, 87, 112, 126; 327/108, 109
See application file for complete search history.

(56) References Cited

U.S. PATENT DOCUMENTS

| | | | | |
|---|---|---|---|---|
| 6,448,815 B1* | 9/2002 | Talbot et al. | ..................... | 326/86 |
| 7,307,447 B2* | 12/2007 | Clements et al. | ................. | 326/30 |
| 7,307,449 B1* | 12/2007 | Redgrave et al. | ................ | 326/38 |
| 7,595,661 B2* | 9/2009 | Kim | ................................ | 326/82 |
| 2002/0130680 A1* | 9/2002 | Meyer et al. | ..................... | 326/30 |
| 2004/0068600 A1* | 4/2004 | Cranford et al. | ............... | 710/300 |
| 2007/0103186 A1* | 5/2007 | Clements et al. | ................ | 326/30 |
| 2007/0139071 A1* | 6/2007 | Nguyen | .......................... | 326/30 |
| 2010/0237903 A1* | 9/2010 | Nguyen | .......................... | 326/30 |

FOREIGN PATENT DOCUMENTS

| KR | 1020050003895 | 1/2005 |
|---|---|---|
| KR | 10-0667594 | 1/2007 |
| KR | 1020080030944 | 4/2008 |

OTHER PUBLICATIONS

English Abstract for Publication No. 10-2005-0003895.
English Abstract for Publication No. 1020060050821 (for 10-0667594).
English Abstract for Publication No. 10-2008-0030944.

\* cited by examiner

*Primary Examiner* — Shawki S Ismail
*Assistant Examiner* — Dylan White
(74) *Attorney, Agent, or Firm* — F. Chau & Associates, LLC (57) ABSTRACT

A transceiver for controlling a swing width of an output voltage includes a transmitter and a receiver for receiving an output voltage of a transmitter. The transmitter includes a first signal converter that outputs changed data generated by changing a voltage level of data in response to a mode control signal for selecting a test mode or a normal mode, an output voltage control circuit for controlling a voltage level of an output node of the transmitter in response to the changed data, and a first termination circuit for supplying a changed power supply voltage generated by changing a voltage level of a power supply voltage of the output node of the transmitter, or is turned off, in response to a test mode enable signal or the changed data. The receiver includes a second termination circuit that operates as a resistor having a resistance value that varies in response to the test mode enable signal or a test mode disable signal.

16 Claims, 7 Drawing Sheets

TRANSCEIVER FOR CONTROLLING SWING WIDTH OF OUTPUT VOLTAGE

CROSS-REFERENCE TO RELATED APPLICATIONS

This application claims the benefit from Korean Patent Application No. 10-2009-0061142, filed on Jul. 6, 2009, in the Korean Intellectual Property Office, the contents of which are herein incorporated by reference in their entirety.

BACKGROUND

The present disclosure is directed to a transceiver for controlling a swing width of an output voltage.

Semiconductor devices, such as processors, controllers, and memory devices, generally include data transceivers for transmitting and receiving data.

Such data transceivers receive or transmit data through one transmission line.

SUMMARY

Embodiments of the invention provide a transceiver for controlling a swing width of an output voltage.

According to an aspect of the invention, there is provided a transceiver including: a transmitter; and a receiver for receiving an output voltage of a transmitter, wherein the transmitter includes: a first signal converter for receiving data and outputing changed data generated by changing a voltage level of the received data in response to a mode control signal for selecting one of a test mode or a normal mode; an output voltage control circuit for controlling a voltage level of an output node of the transmitter in response to the changed data; and a first termination circuit for supplying to the output node of the transmitter a changed power supply voltage generated by changing a voltage level of a power supply voltage, in response to a test mode enable signal or the changed data, and the receiver includes a second termination circuit that operates as a resistor having a resistance value that varies in response to the test mode enable signal or a test mode disable signal.

The transmitter may further include a mode control signal generator for generating the mode control signal, wherein the mode control signal generator may include: a second signal converter for receiving the mode control signal and an input voltage, and outputting a changed input voltage generated by changing a voltage level of the input voltage in response to the mode control signal; a current source circuit for generating a source current in response to the changed input voltage; a third termination circuit that is connected to the current source circuit through a connection node, and supplies the changed power supply voltage to the connection node in response to the test mode enable signal; and a comparator that outputs the mode control signal by comparing a voltage of the connection node and a reference voltage.

The transmitter may further include a varying power supply voltage generator that is connected to the first termination circuit through a connection node, and generates the changed power supply voltage, wherein the varying power supply voltage generator may include: a comparator that outputs a result of comparing a voltage of the connection node and a reference voltage; and a MOS transistor that has a gate to which the result is applied, a first terminal connected to the power supply voltage, and a second terminal connected to the connection node.

The first signal converter may include: a buffer for converting the received data into the changed data; and a MOS transistor that has a gate to which the mode control signal is applied, a first terminal connected to the power supply voltage, and a second terminal connected to the buffer.

The output voltage control circuit may include: a MOS transistor that has a gate to which the changed data is applied, a first terminal to which a ground power source is applied, and a second terminal; and a first resistor that connects the second terminal of the MOS transistor and the first termination circuit.

The first termination circuit may include: a mode selector that outputs the test mode enable signal or the changed data in response to a mode select signal; a MOS transistor that has a gate to which the test mode enable signal or the changed data is applied, a first terminal connected to the changed power supply voltage, and a second terminal; and a second resistor that connects the second terminal of the MOS transistor and the current source circuit, wherein said MOS transistor is turned on in response to the test mode enable signal and when the changed data has a low voltage level, and said MOS transistor is turned when the changed data has a high voltage level.

The transmitter may further include a supply voltage control circuit that includes a voltage determiner that determines a voltage level of the test mode enable signal corresponding to the voltage level of a final voltage of the connection node, and a voltage supplier that generates the reference voltage having a positive voltage level and the test mode enable signal having a negative voltage level in response to the determination of the voltage determiner.

The second termination circuit of the receiver may include a mode selector and a resistance controller that controls resistance of a plurality of transistors of the second termination circuit in response to one of the test mode enable signal or test mode disable signal received from said mode selector.

The receiver may further include a sub varying power supply voltage generator that supplies a changes power supply voltage to the plurality of transistors of the second termination circuit.

According to another aspect of the inventive concept, there is provided a transceiver including: a transmitter; and a receiver for receiving an output voltage of the transmitter, wherein the transmitter includes: a first buffer for receiving data and converting data into internal data; a first termination circuit that operates as a resistor connected to an output node of the transmitter, in response to the internal data; a second termination circuit for supplying a changed power supply voltage generated by changing a voltage level of a power supply voltage to the output node of the transmitter, in response to a test mode enable signal or the changed data; and a first current source circuit that is connected to the first termination circuit and generates a source current in response to a current source enable signal or a current source disable signal, and the receiver includes a third termination circuit that operates as a resistor having a resistance value that varies in response to the test mode enable signal or a test mode disable signal.

The transmitter may further include a current source enable signal generator for generating the current source enable signal, wherein the current source enable signal generator may include: a second buffer for converting the received data into the internal data; a fourth termination circuit that operates as a resistor in response to the internal data; and a fifth termination circuit that is connected to the fourth termination circuit through a connection node for supplying the changed power supply voltage to the connection node in response to the test mode enable signal; a second current source circuit that is connected to the fourth termination circuit for generating a source current in response to a current source enable signal; and a comparator that outputs the current source enable signal by comparing a voltage of the connection node and a reference voltage.

The first termination circuit may include: a mode selector that outputs the current source enable signal or the current source disable signal in response to the mode select signal; and a MOS transistor that has a gate to which the current source enable signal or the current source disable signal is applied, a first terminal connected to the second termination circuit, and the second terminal connected to a ground power source.

The transmitter may further include a varying power supply voltage generator connected to the second termination circuit through a connection node for generating the changed power supply voltage, wherein the varying power supply voltage generator may include a comparator that outputs a result of comparing a voltage of the connection node and a reference voltage, and a MOS transistor having a gate to which the result is applied, a first terminal connected to the power supply voltage, and a second terminal connected to the connection node.

The first termination circuit may be turned off in response to the internal data.

The second termination circuit may be turned off in response to the internal data.

According to another aspect of the inventive concept, there is provided a method of controlling an output voltage of a transmitter, the method including: outputting changed data generated by changing a voltage level of received data, in response to a mode control signal for determining a test mode or a normal mode; selectively supplying a changed power supply voltage generated by changing a voltage level of a power supply voltage to an output node of the transmitter, in response to a test mode enable signal or the changed data; and controlling a voltage level of the output node of the transmitter in response to the changed data, wherein a receiver for receiving an output voltage of the transmitter has a resistance value that changes in response to the test mode enable signal or a test mode disable signal.

According to another aspect of the inventive concept, there is provided a method of controlling an output voltage of a transmitter, the method including: converting received data into internal data; selectively supplying a changed power supply voltage generated by changing a voltage level of a power supply voltage to an output node of the transmitter, in response to a test mode enable signal or the internal data; and controlling a voltage level of the output node of the transmitter by selectively generating a source current in response to the current source enable signal or the current source disable signal, wherein a receiver for receiving an output voltage of the transmitter has a resistance value that varies in response to the test mode enable signal or a test mode disable signal.

DETAILED DESCRIPTION OF EXEMPLARY EMBODIMENTS

Hereinafter, exemplary embodiments will be described in detail with reference to the attached drawings. Like reference numerals in the drawings denote like elements.

Figure 1:
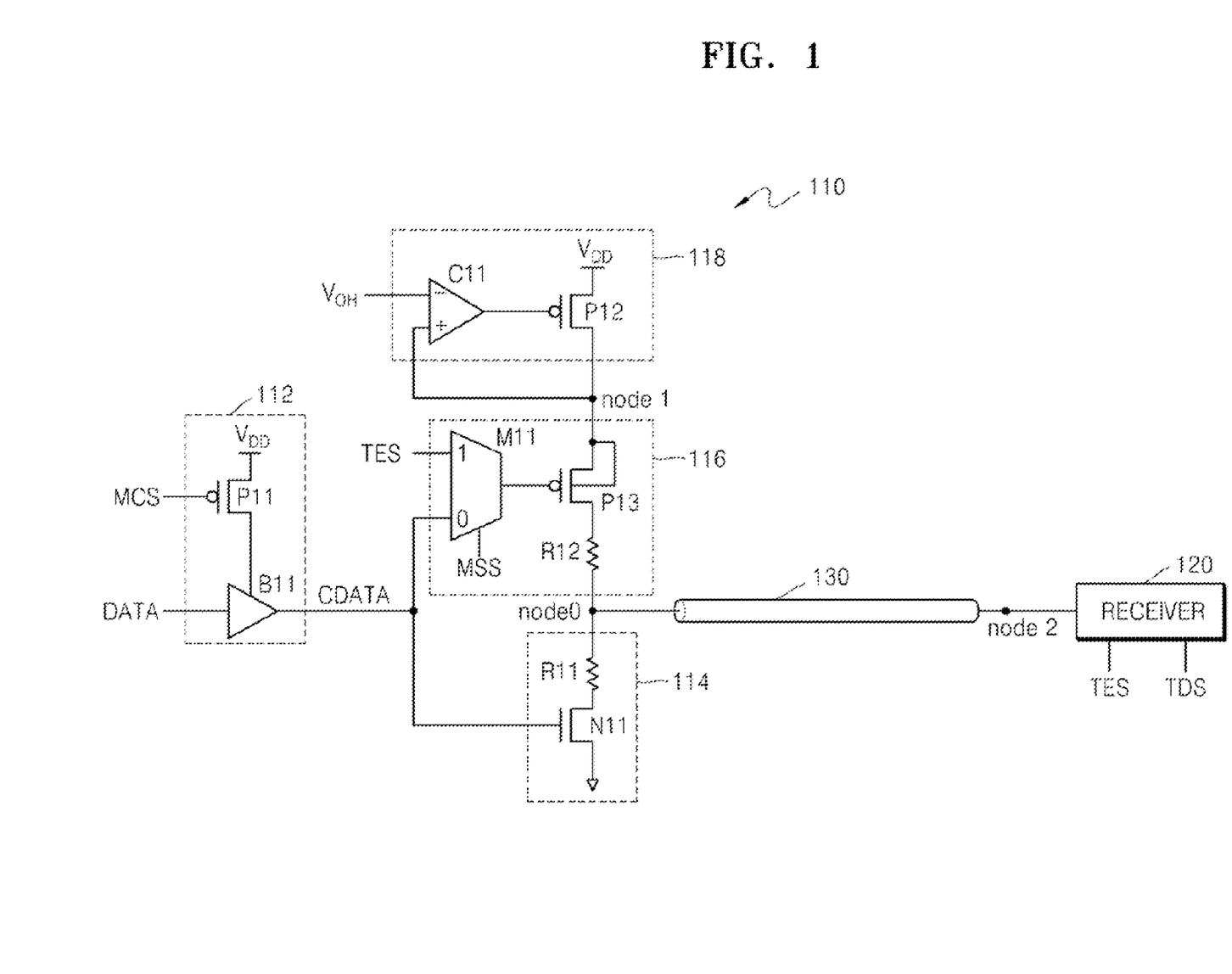
FIG. 1 is a diagram illustrating a transceiver according to an embodiment of the invention.

FIG. 1 is a diagram illustrating a transceiver according to an embodiment of the invention.

FIG. 1 illustrates a transmitter 110 and a receiver 120. Here, the transmitter 110 includes a first signal converter 112, an output voltage control circuit 114, a first termination circuit 116, and a varying power supply voltage generator 118.

The first signal converter 112 is connected to a power supply voltage $V_{DD}$, receives data DATA and a mode control signal MCS for determining a test mode or a normal mode, and outputs changed data CDATA generated by changing a voltage level of the data DATA in response to the received mode control signal MCS.

In detail, a PMOS transistor P11 supplies the power supply voltage $V_{DD}$ to a buffer B11 in response to a voltage level of the mode control signal MCS.

Here, the mode control signal MCS may have a voltage level between a low level and a high level.

For example, when the voltage level of the mode control signal MCS is a low level, the power supply voltage $V_{DD}$ is applied to the buffer B11, and when the voltage level of the mode control signal MCS is a high level, a voltage having a low level is applied to the buffer B11.

The buffer B11 receives the data DATA, and outputs the changed data CDATA by changing the voltage level of the received data DATA.

Here, the data DATA may have a low level or a high level, and the changed data CDATA may have a low level, a high level, or a bias voltage level.

In detail, when the voltage level of the data DATA is a high level, the voltage level of the changed data CDATA has a low level, a high level, or a bias voltage level in response to a voltage level of the mode control signal MCS.

However, when the voltage level of the data DATA is a low level, the voltage level of the changed data CDATA is a low level regardless of the voltage level of the mode control signal MCS.

The output voltage control circuit 114 controls a voltage level of an output node node0 of the transmitter 110 in response to the changed data CDATA received from the first signal converter 112.

In detail, an NMOS transistor N11 operates as a current source when the voltage level of the changed data CDATA received in a gate of the NMOS transistor N11 is a bias voltage level, thereby controlling the voltage level output from the output node node0 of the transmitter 110 by generating a source current.

As such, when the NMOS transistor N11 operates as a current source, the NMOS transistor N11 is in a saturation mode, and thus has almost an infinite resistance. Accordingly, a resistance value of a resistor R11 connected to the NMOS transistor N11 may be ignored, and thus does not affect a voltage of the output node node0 of the transmitter 110.

A voltage level of the mode control signal MCS received by the first signal converter 112 when the changed data CDATA has a bias voltage level applied to the NMOS transistor N11 will now be referred to as a test mode voltage level.

Hereinafter, a test mode is selected when the first signal converter 112 receives the mode control signal MCS having a test mode voltage level, and a normal mode is selected when the first signal converter 112 receives the mode control signal MCS having a voltage level other than the test mode voltage level.

Also, in the transmitter 110, when the voltage level of the data DATA is a low level, the voltage level of the output node node0 is a high level. Here, a high level voltage from the output node node0 will be referred to as the maximum output voltage. In addition, when the voltage level of the data DATA is a high level, the voltage level of the output node node0 is a low level. Here, the low level voltage of the output node node0 will be referred to as the minimum output voltage.

The output voltage control circuit 114 operates as a current source only in a test mode and when the data DATA has a high level. Accordingly, the output voltage control circuit 114 controls a voltage level of the minimum output voltage by using the source current.

To apply the mode control signal MCS having a test mode voltage level to the first signal converter 112, a user may directly apply the mode control signal MCS having the test mode voltage level, or use a mode control signal generator connected to the first signal converter 112 (not shown) to generate the mode control signal MCS having a test mode voltage level. The mode control signal generator will be described in detail below with reference to FIG. 4.

The first termination circuit 116 either supplies to the output node node0 a power supply voltage generated by changing the voltage level of the power supply voltage $V_{DD}$, or is turned off, in response to a test mode enable signal TES or the changed data CDATA.

In detail, a mode selector M11 receives the test mode enable signal TES and the changed data CDATA, and then outputs either the test mode enable signal TES or the changed data CDATA in response to a mode select signal MSS.

Here, the mode select signal MSS is a signal that directs the mode selector M11 to output either the test mode enable signal TES in the test mode or the changed data CDATA in the normal mode.

Accordingly, a PMOS transistor P13 is always turned on in the test mode. However, in the normal mode, the PMOS transistor P13 is turned on when the voltage level of the changed data CDATA is a low level and is turned off when the voltage level of the changed data CDATA is a high level.

A resistor R12 is connected to the output node node0 of the transmitter 110.

The varying power supply voltage generator 118 generates the changed power supply voltage by being connected to the first termination circuit 116 through a connection node node1.

In detail, a comparator C11 outputs a result of comparing a voltage of the connection node node1 and a first reference voltage $V_{OH}$.

A PMOS transistor P12 supplies the power supply voltage $V_{DD}$ to the connection node node1 in response to the result output from the comparator C11.

When the comparator C11 and the PMOS transistor P12 continuously operate, the final voltage of the connection node node1 has a voltage level identical to that of the first reference voltage $V_{OH}$.

Here, the first reference voltage $V_{OH}$ may be used to assign the maximum output voltage of the output node node0, as will be described below in detail with reference to FIG. 2.

Alternatively, the changed power supply voltage may be directly applied to the connection node node1, without connecting the varying power supply voltage generator 118 to the connection node node1.

In the current embodiment, when the voltage level of the changed power supply is applied to the connection node node1, the voltage level of the test mode enable signal TES may change accordingly and be transmitted to the first termination circuit 116.

For example, a test mode enable signal TES having a voltage level that decreases in proportion to the decrease of the voltage level of the changed power supply may be transmitted to the first termination circuit 116.

Here, when the changed power supply voltage applied to the PMOS transistor P13 is decreased, a turn on resistance value of the PMOS transistor P13 increases. When the test mode enable signal TES having a voltage level that decreases in proportion to the changed power supply voltage is applied to the PMOS transistor P13, the turn on resistance value of the PMOS transistor P13 decreases. Accordingly, the PMOS transistor P13 always maintains a uniform turn on resistance value.

Table 1 shows a resistance value of the first termination circuit 116 according to the final voltage of node1, which has a voltage level identical to that of the first reference voltage $V_{OH}$ and the test mode enable signal TES. Here, the resistance value of the first termination circuit 116 is equal to a value obtained by adding the turn on resistance value of the PMOS transistor P13 and the resistance value of the resistor R12.

TABLE 1

| | TES (V) | | | | | | | | | |
|---|---|---|---|---|---|---|---|---|---|---|
| $V_{OH}$(V) | 0.00 | −0.05 | −0.10 | −0.15 | −0.20 | −0.25 | −0.30 | −0.35 | −0.40 | −0.45 |
| 1.5 | 50.000 | 49.669 | 49.020 | 48.701 | 48.387 | 48.077 | 47.771 | 47.468 | 47.170 | 46.875 |
| 1.3 | 52.381 | 51.402 | 50.459 | 50.000 | 49.550 | 49.107 | 48.673 | 48.246 | 47.826 | 47.414 |
| 1.1 | 55.911 | 54.432 | 53.191 | 52.161 | 51.320 | 50.578 | 49.929 | 49.435 | 48.951 | 48.544 |
| 0.0 | 63.559 | 60.241 | 57.692 | 55.762 | 54.348 | 53.191 | 52.083 | 51.195 | 50.505 | 49.834 |

In Table 1, the resistance value of the first termination circuit 116 is shown for values of the final voltage $V_{OH}$ of node1 ranging from 1.5 V to 0 V, and for test mode enable signal TES voltages ranging from 0 V to −0.45 V.

For example, when the final voltage $V_{OH}$ of node1 is 1.5 V and the test mode enable signal TES is 0 V, the resistance value of the first termination circuit 116 is 50 ohms. When the final voltage $V_{OH}$ of node1 is decreased to 1.3 V, the resistance value of the first termination circuit 116 is 52.381 ohms, and when the test enable signal TES is decreased to −0.15 V, the resistance value of the first termination circuit 116 returns to 50 ohms.

Alternatively, a supply voltage control circuit (not shown) for supplying the first reference voltage $V_{OH}$ and the test mode enable signal TES based on a lookup table like Table 1 may be connected to the transmitter 110. The supply voltage control circuit will be described below with reference to FIG. 3.

The receiver 120 receives the test mode enable signal TES and a test mode disable signal TDS, and includes a second termination circuit (not shown) that operates as a resistor having a resistance value that varies in response to the received test mode enable signal TES or the test mode disable signal TDS.

Here, an input node node2 of the receiver 120 is connected to the output node node0 of the transmitter 110 through a transmission line 130, and has the same voltage level as the output node node0 of the transmitter 110.

According to an embodiment of the invention, the voltage level of the output node node0 is adjusted by using the output voltage control circuit 114 that operates as a current source. Thus, a transceiver according to an embodiment of the invention may be prepared with lower manufacturing costs, as compared to a transceiver in which the voltage level of the output node node0 of the transmitter 110 is adjusted by using a variable voltage.

Figure 2:
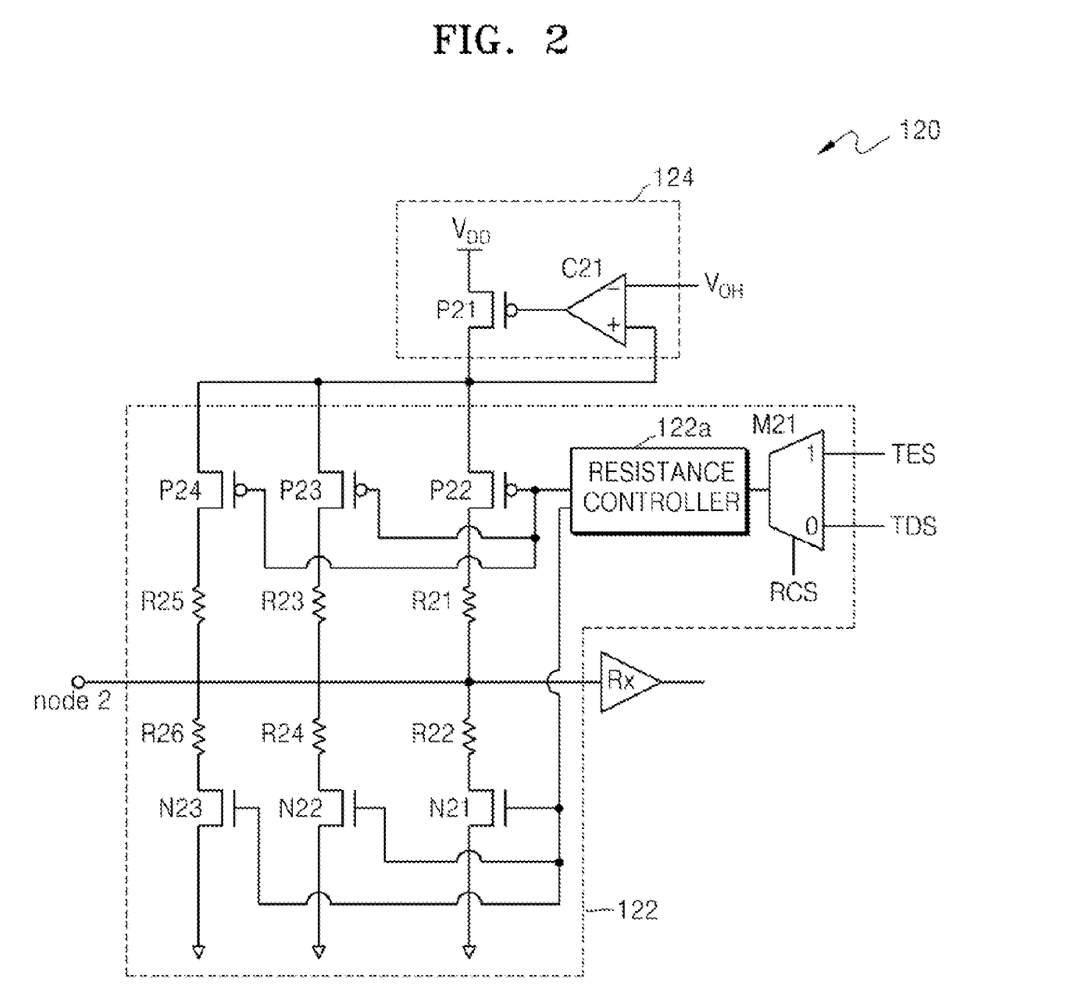
FIG. 2 is a diagram illustrating a receiver of the transmitter of FIG. 1, according to an embodiment of the invention.

FIG. 2 is a diagram illustrating the receiver 120 of FIG. 1, according to an embodiment of the inventive concept.

Referring to FIG. 2, the receiver 120 includes a second termination circuit 122 and a sub varying power supply voltage generator 124.

A mode selector M21 of the second termination circuit 122 outputs to a resistance controller 122a the test mode enable signal TES or the test mode disable signal TDS in response to a receiver control signal RCS.

Here, the receiver control signal RCS is a signal that directs the mode selector M21 to output either the test mode enable signal TES in the test mode, or the test mode disable signal TDS in the normal mode.

The resistance controller 122a controls resistance values of MOS transistors P22, P23, P24, N21, N22, and N23 of the second termination circuit 122 in response to the test mode enable signal TES or the test mode disable signal TDS.

In detail, the resistance controller 122a may determine which of first through third PMOS transistors P22, P23, and P24, and first through third NMOS transistors N21, N22, and N23 is to be turned on.

For example, when the test mode enable signal TES is input to the second termination circuit 122, the resistance controller 122a may turn on the first and second PMOS transistors P22 and P23, and turn off the third PMOS transistor P24, and the first through third NMOS transistors N21, N22, and N23.

In other words, in the above example, only resistors R21 and R23 connected to the first and second PMOS transistors P22 and P23 are connected to the input node node2 of the receiver 120. Here, the sum of the resistance values of the resistors R21 and R23 connected to the input node node2 of the receiver 120 may be identical to the resistance value of the resistor R12 connected to the output node node0 of the transmitter 110 of FIG. 1.

Alternatively, when the test mode disable signal TDS is input to the second termination circuit 122, the resistance controller 122a may turn on only the first PMOS transistor P22 and the first NMOS transistor N21, and turn off the second and third PMOS transistors P23 and P24, and the second and third NMOS transistors N22 and N23. In other words, only the resistor R21 connected to the first PMOS transistor P22 and a resistor R22 connected to the first NMOS transistor N21 are connected to the input node node2 of the receiver 120. Here, the resistors R21 and R22 connected to the input node node2 of the receiver 120 may each have a resistance value that is twice the resistance value of the resistor R12 connected to the output node node0 of the transmitter 110 of FIG. 1.

In FIG. 2, the second termination circuit 122 is depicted as including 6 MOS transistors: the first through third PMOS transistors P22, P23, and P24, and the first through third NMOS transistors N21, N22, and N23. However, the number of MOS transistors is not limited to 6, and the second termination circuit 122 may include any other number of MOS transistors.

As such, the receiver 120 according to the current embodiment operates as a resistor that changes resistance value according to a test mode or a normal mode. Accordingly, the transmitter 110 controls a voltage of the output node node0 in the test mode, and the transmitter 110 and the receiver 120 each operates as a termination circuit in the normal mode.

Referring to FIGS. 1 and 2, the minimum output voltage of the output node node0 in the test mode is determined by a source current generated in the output voltage control circuit 114 of FIG. 1 and the resistors R21 and R23 connected to the input node node2, when the resistor R12 of the first termination circuit 116 and the second termination circuit 122 are in the test mode. Also, the maximum output voltage of the transmitter 110 in the test mode is determined by the first reference voltage $V_{OH}$ and the resistors R21 and R23 connected to the input node node2, when the resistor R12 of the first termination circuit 116 and the second termination circuit 122 are in the test mode.

Here, when the sum of the resistance values of the resistors R21 and R23 respectively connected to the first and second PMOS transistors P22 and P23 of the second termination circuit 122 are identical to the resistance value of the resistor R12 of the first termination circuit 116, the maximum output voltage output from the output node node0 has the same voltage level as the first reference voltage $V_{OH}$ when the transmitter 110 is in the test mode.

In other words, when the voltage level of the data DATA is a low level in test mode, the output voltage control circuit 114 is turned off and the first termination circuit 116 is turned on, and thus the output node node0 is connected to the resistor R12. Since it is in test mode, the test mode enable signal TES is input to the second termination circuit 122, and thus the resistors R21 and R23 respectively connected to the first and second PMOS transistors P22 and P23 are connected to the input node node2. Here, when the resistance value of the resistor R12 connected to the output node node0 and the sum of the resistance values of the resistors R21 and R23 connected to the input node node2 are the same, a voltage having the same voltage level as the changed power supply voltage $V_{OH}$ applied to the resistor R12 is applied to the output node node0.

By designing the sum of the resistance values of the resistors R21 and R23 respectively connected to the first and second PMOS transistors P22 and P23 to be identical to the resistance value of the resistor R12 of the first termination circuit 116, applying the first reference voltage $V_{OH}$ having a user-defined voltage level to the varying power supply voltage generator 118 in test mode causes the maximum output voltage of the output node node0 to have a voltage level desired by the user.

The sub varying power supply voltage generator 124 performs the same operations as the varying power supply voltage generator 118 of FIG. 1, and thus detailed descriptions about the sub varying power supply voltage generator 124 will be omitted herein. Alternatively, the receiver 120 may lack the sub varying power supply voltage generator 124, and the varying power supply voltage generator 118 of the transmitter 110 may directly apply a power supply voltage to the second termination circuit 122 of the receiver 120.

Figure 3:
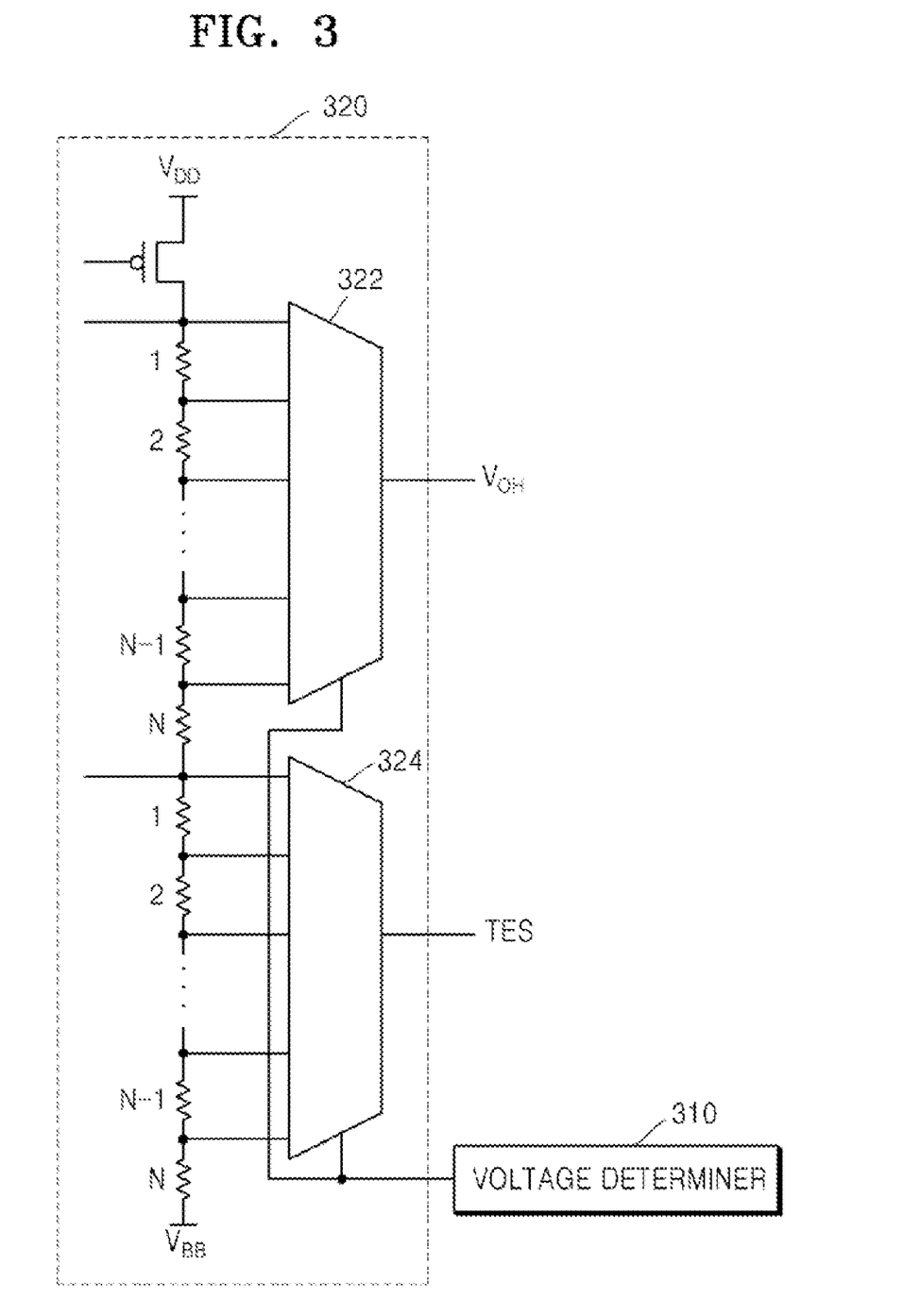
FIG. 3 is a diagram illustrating a supply voltage control circuit according to an embodiment of the invention.

FIG. 3 is a diagram illustrating a supply voltage control circuit according to an embodiment of the invention.

Referring to FIG. 3, the supply voltage control circuit includes a voltage determiner 310 and a voltage supplier 320.

When the voltage level of the first reference voltage $V_{OH}$ is determined, the voltage determiner 310 determines a voltage level of the test mode enable signal TES corresponding to the voltage level of the final voltage of node1 based on a lookup table.

For example, when the first reference voltage $V_{OH}$ is determined to be 1.3 V, the voltage determiner 310 may determine the voltage level of the test mode enable signal TES to be −0.15 V according to the final voltage $V_{OH}$ of node1 which has a voltage level identical to that of the first reference voltage $V_{OH}$ based on Table 1 above.

The voltage supplier 320 generates the first reference voltage $V_{OH}$ and the test mode enable signal TES in response to the determination of the voltage determiner 310.

A first supply voltage generator 322 generates the first reference voltage $V_{OH}$ having a positive voltage level.

A second supply voltage generator 324 generates the test mode enable signal TES having a negative voltage level.

Here, a first power supply voltage $V_{DD}$ connected to the top of the first supply voltage generator 322 has a positive voltage level, and a second power supply voltage $V_{BB}$ connected to the bottom of the second supply voltage generator 324 has a negative voltage level.

The first reference voltage $V_{OH}$ generated by the voltage supplier 320 is applied to the comparator C11 of the varying power supply voltage generator 118 of FIG. 1, and the test mode enable signal TES is applied to the mode selector M11 of the first termination circuit 116 of FIG. 1.

Figure 4:
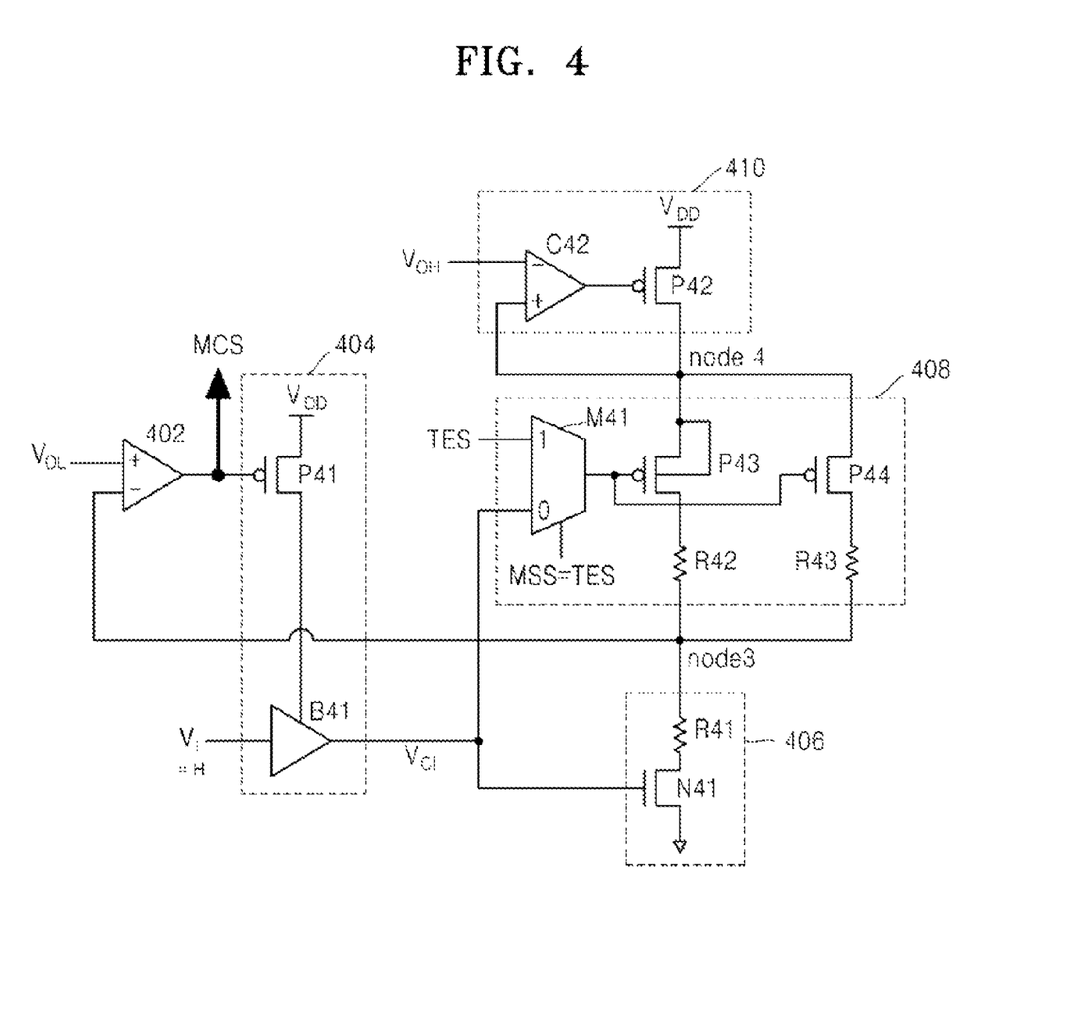
FIG. 4 is a diagram illustrating a mode control signal generator according to an embodiment of the invention.

FIG. 4 is a diagram illustrating the mode control signal generator according to an embodiment of the invention.

Referring to FIG. 4, the mode control signal generator includes a comparator 402, a second signal converter 404, a current source circuit 406, a third termination circuit 408, and a sub varying power supply voltage generator 410.

In FIG. 4, the second signal converter 404, the current source circuit 406, and the sub varying power supply voltage generator 410 respectively correspond to the first signal converter 112, the output voltage control circuit 114, and the varying power supply voltage generator 118 of FIG. 1. Also, the third termination circuit 408 corresponds to a combination of the first termination circuit 116 of FIG. 1 and the second termination circuit 122 of FIG. 2.

Operations of the mode control signal generator of FIG. 4 will now be described in brief as a replica circuit for the transceiver of FIG. 1. A voltage of a first connection node node3 is controlled by a source current generated in the current source circuit 406, and resistors R42 and R43 of the third termination circuit 408. The voltage of the first connection node node3 is controlled by the comparator 402 to have an identical voltage level as a second reference voltage $V_{OL}$. Here, for the current source circuit 406 to operate as a current source, only an input voltage $V_I$ having a high level is applied to the second signal converter 404, and only the test mode enable signal TES is applied to the third termination circuit 408.

Here, since the first connection node node3 of the mode control signal generator corresponds to the output node node0 of the transmitter 110, the voltage of the output node node0 has the same voltage level as the second reference voltage $V_{OL}$, when the mode control signal MCS output from the comparator 402 is applied to the first signal converter 112 when the voltage of the first connection node node3 has the same voltage level as the second reference voltage $V_{OL}$.

Operations of the mode control signal generator will now be described in detail.

The comparator 402 compares the second reference voltage $V_{OL}$ with the voltage of the first connection node node3, and outputs the result of the comparison. When the second reference voltage $V_{OL}$ and the voltage of the first connection node node3 has the same voltage level, the comparator 402 outputs the mode control signal MCS having a voltage level of the test mode.

The second signal converter 404 receives the mode control signal MCS and the voltage $V_I$, and outputs a changed input voltage $V_{CI}$ generated by changing the voltage level of the input voltage $V_I$ in response to the received mode control signal MCS. Here, the input voltage $V_I$ has a high level.

The current source circuit 406 generates a source current in response to the changed input voltage $V_{CI}$.

Here, the current source circuit 406 operates as a current source only when the changed input voltage $V_{CI}$ has a bias voltage level.

The third termination circuit 408 supplies the changed power supply voltage, i.e. a voltage of a second connection node node4, to the first connection node node3 in response to the test mode enable signal TES. Here, the changed power supply voltage, which is a voltage of the node 4, has the same voltage level as the first reference voltage $V_{OH}$.

Here, a mode selector M41 outputs only the test mode enable signal TES from among the test mode enable signal TES and the changed input voltage $V_{CI}$, in response to the mode select signal MSS. In other words, the mode select signal MSS directs the mode selector M41 to output only the test mode enable signal TES having a low level, so that the third termination circuit 408 operates in a test mode.

The sub varying power supply voltage generator 410 performs the same operations as the varying power supply voltage generator 118 of FIG. 1, and thus detailed descriptions thereof are omitted herein. Alternatively, the mode control signal generator may lack the sub varying power supply voltage generator 410, and the varying power supply voltage generator 118 of the transmitter 110 may directly apply a changed power supply voltage to the second connection node node4 of the mode control signal generator.

Figure 5:
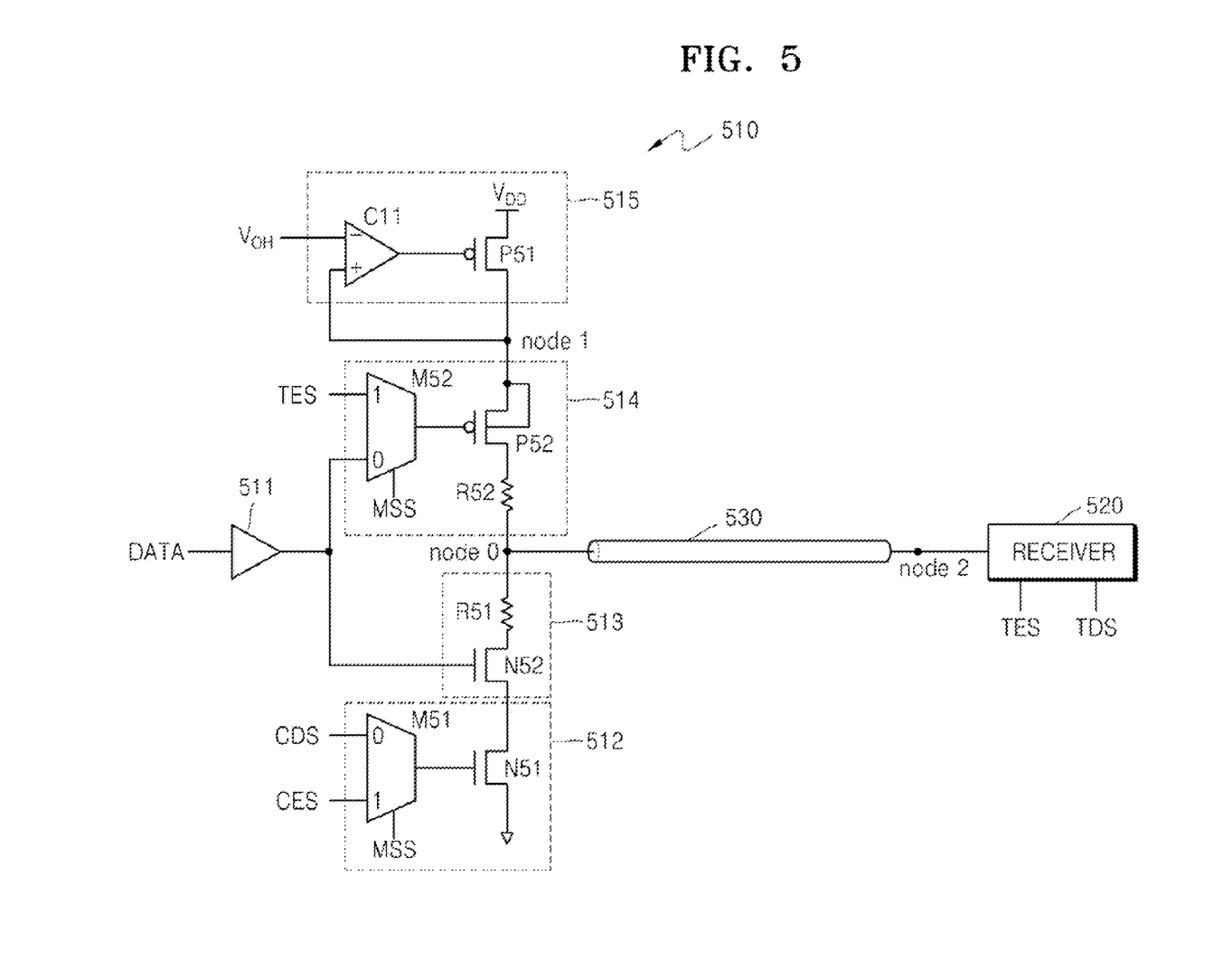
FIG. 5 is a diagram illustrating a transceiver according to another embodiment of the invention.

FIG. 5 is a diagram illustrating a transceiver according to another embodiment of the invention.

FIG. 5 illustrates a transmitter 510 and a receiver 520. Here, the transmitter 510 includes a first buffer 511, a first current source circuit 512, a first termination circuit 513, a second termination circuit 514, and a varying power supply voltage generator 515.

Comparing the transceiver of FIG. 1 and the transceiver of FIG. 5, data DATA of the transceiver of FIG. 5 is transmitted to the first buffer 511 instead of the first signal converter 112 and thus the first buffer 511 outputs internal data without changing a voltage level of the data DATA. Also, The first current source circuit 512 is further included in the bottom of the first termination circuit 513, and thus the first termination circuit 513 corresponding to the output voltage control circuit 114 of FIG. 1 does not operate as a current source.

In FIG. 5, the transceiver is in a test mode when a current source enable signal CES is applied to the first current source circuit 512 and is in a normal mode when a current source disable signal CDS is applied to the first current source circuit 512.

Except for the above differences, the operations of the transceiver of FIG. 5 are identical to the operations of the transceiver of FIG. 1.

In other words, the minimum output voltage of the output node node0 of the transmitter 510 in the test mode may be determined by a source current generated in the first current source circuit 512, a resistor R52 of the second termination circuit 514, and a variable resistor (not shown) included in the receiver 520. Also, the maximum output voltage in the test mode may be determined by the first reference voltage $V_{OH}$, the resistor R52 of the second termination circuit 514, and the variable resistance of the variable resistor included in the receiver 520.

Here, when the first current source circuit 512 operates as a current source, an NMOS transistor N51 operates in a saturation mode and thus has almost an infinite resistance. Accordingly, a resistance value of a resistor R51 of the first termination circuit 513 connected to the NMOS transistor N51 in series may be ignored, and thus does not affect the voltage of the output node node0 of the transmitter 510.

Operations of the transceiver will now be described in detail.

The first buffer 511 converts the data DATA into internal data.

Here, the data DATA and the internal data may have the same voltage level. For example, the data DATA and the internal data may have a high level or a low level.

The first current source circuit 512 generates the source current in response to the current source enable signal CES or the current source disable signal CDS.

A mode selector M51 in the first current source circuit 512 receives the current source enable signal CES or the current source disable signal CDS, and outputs the current source enable signal CES or the current source disable signal CDS in response to a mode select signal MSS.

Here, the mode select signal MSS directs the mode selector M51 to output the current source enable signal CES in the test mode, and to output the current source disable signal CDS in the normal mode.

Here, the current source enable signal CES has a bias voltage level, and the current source disable signal CDS has a high level.

The NMOS transistor N51 operates as a current source only when the current source enable signal CES is applied to a gate of the NMOS transistor N51.

The first termination circuit 513 operates either as the resistor R51 connected to the output node node0 of the transmitter 510, or is turned off, in response to the internal data.

The second termination circuit 514 supplies the changed power supply voltage, which is a voltage of the node1, to the output node node0 of the transmitter 510 in response to the test mode enable signal TES or the internal data.

In detail, a PMOS transistor P52 is always turned on in the test mode. However, in the normal mode, the PMOS transistor P52 is turned on when the internal data has a low level and is turned off when the internal data has a high level.

Here, the changed power supply voltage has a voltage level of first reference voltage $V_{OH}$.

Since the varying power supply voltage generator 515 performs the same operations as the varying power supply voltage generator 118 of FIG. 1, detailed descriptions thereof are omitted herein.

The receiver 520 includes a third termination circuit (not shown) that operates as a resistor having a resistance value that varies in response to the test mode enable signal TES or the test mode disable signal TDS.

Here, the structure of the third termination circuit is identical to that of the second termination circuit 122 of FIG. 2, and detailed descriptions thereof are omitted herein.

An input node node2 of the receiver 520 is connected to the output node node0 of the transmitter 510 through a transmission line 530.

Figure 6:
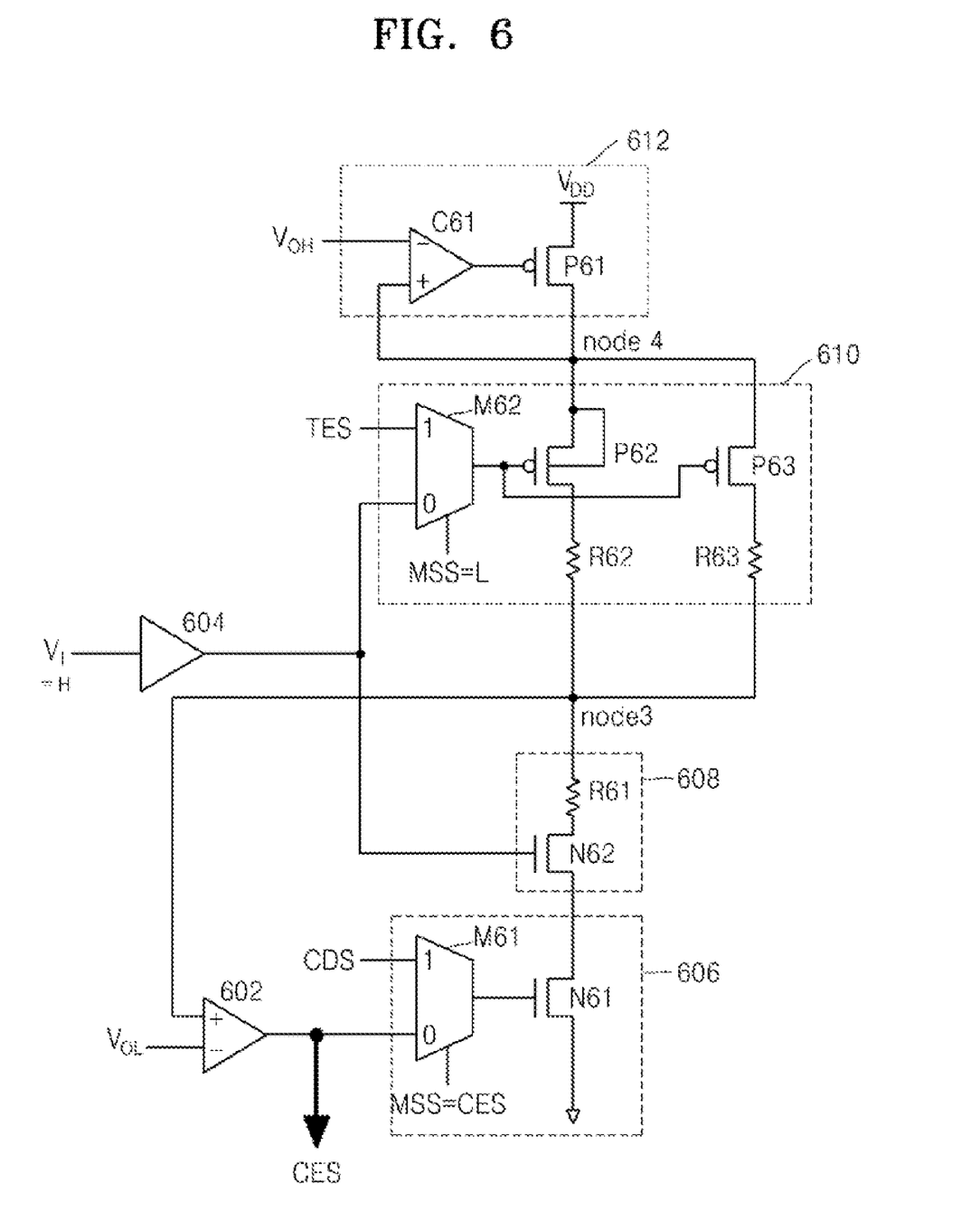
FIG. 6 is a diagram illustrating a current source enable signal generator according to an embodiment of the invention.

FIG. 6 is a diagram illustrating a current source enable signal generator according to an embodiment of the invention.

Referring to FIG. 6, the current source enable signal generator includes a comparator 602, a second buffer 604, a second current source circuit 606, a fourth termination circuit 608, a fifth termination circuit 610, and a sub varying power supply voltage generator 612.

In FIG. 6, the second buffer 604, the second current source circuit 606, the fourth termination circuit 608, and the sub varying power supply voltage generator 612 respectively correspond to the first buffer 511, the first current source circuit 512, the first termination circuit 513, and the varying power supply voltage generator 515 of FIG. 5.

Also, the fifth termination circuit 610 corresponds to a combination of the second termination circuit 514 and the third termination circuit of receiver 520.

Operations of the current source enable signal generator of FIG. 6 will now be described in brief as a replica circuit for the transceiver of FIG. 5. A voltage of the first connection node node3 is determined by a source current generated in the second current source circuit 606, and resistors R62 and R63 of the fifth termination circuit 610. The comparator 602 controls the voltage of the first connection node node3 to have the same voltage level as the second reference voltage $V_{OL}$.

Here, since an NMOS transistor N61 of the second current source circuit 606 is not turned off and always operates as a current source, a mode selector M61 of the second current source circuit 606 is designed to apply to the NMOS transistor N61 only the current source enable signal CES from among the current source disable signal CDS and the current source enable signal CES. Also, the second buffer 604 is designed to input the input voltage $V_I$ having a high level so that the fourth termination circuit 608, which is a path for supplying the source current from the second current source circuit 606 to the first connection node node3, is always turned on.

Here, since the first connection node node3 of the current source enable signal generator corresponds to the output node node0 of the transmitter 510 of FIG. 5, the voltage of the output node node0 of the transmitter 510 has the same voltage level as the second reference voltage $V_{OL}$, when the current source enable signal CES output from the comparator 602 is applied to the first current source circuit 512 of the transmitter 510 when the voltage of the first connection node node3 has the same voltage level as the second reference voltage $V_{OL}$.

Operations of the current source enable signal generator will now be described in detail.

The comparator 602 compares the voltage of the first connection node node3 and the second reference voltage $V_{OL}$, and outputs the result of the comparison. Here, when the voltage of the first connection node node3 and the second reference voltage $V_{OL}$ have the same voltage level, the comparator 602 outputs the current source enable signal CES as the result of the comparison. Here, the current source enable signal CES has a bias voltage level.

The second buffer 604 converts data into internal data.

The second current source circuit 606 generates a source current in response to the current source enable signal CES.

The fourth termination circuit 608 is turned on and operates as a resistor in response to the internal data.

The fifth termination circuit 610 supplies the changed power supply voltage, i.e. the voltage of the second connection node node4 to the first connection node node3 in response to the test mode enable signal TES.

Here, the changed power supply voltage, which is a voltage of the node 4, has the same voltage level as the first reference voltage $V_{OH}$.

Since the sub varying power supply voltage generator 612 performs the same operations as the varying power supply voltage generator 118 of FIG. 1, detailed descriptions thereof will be omitted herein. Alternatively, the current source enable signal generator may lack the sub varying power supply voltage generator 612, and the varying power supply voltage generator 515 of the transmitter 510 may directly apply a changed power supply voltage to the second connection node node4 of the current source enable signal generator.

Figure 7:
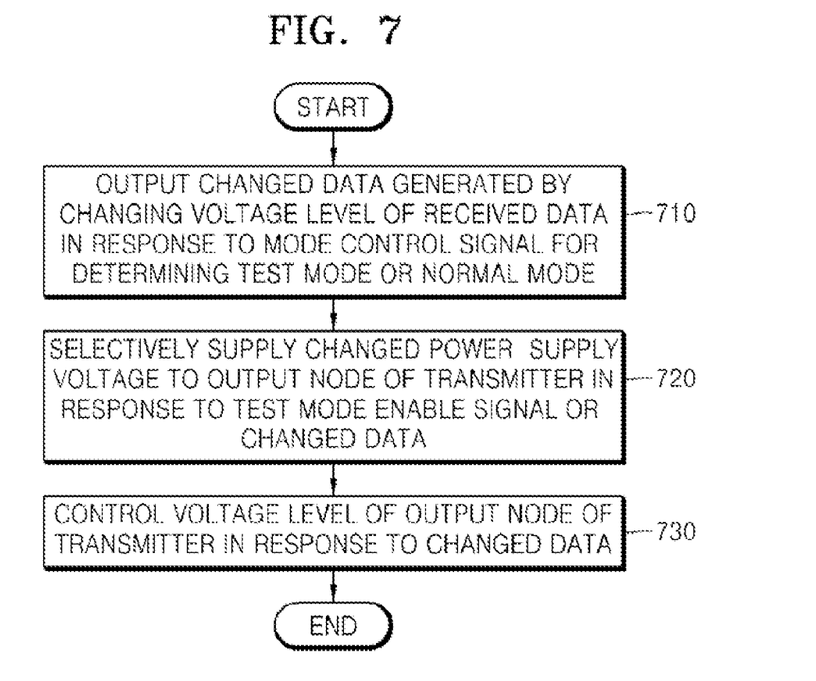
FIG. 7 is a flowchart of a method of controlling an output voltage of a transmitter, according to an embodiment of the invention.

FIG. 7 is a flowchart of a method of controlling an output voltage of a transmitter, according to an embodiment of the invention.

In operation 710, changed data generated by changing a voltage level of received data is output in response to a mode control signal for determining a test mode or a normal mode.

In operation 720, a changed power supply voltage generated by changing a voltage level of a power supply voltage is selectively supplied to an output node of a transmitter in response to a test mode enable signal or the changed data.

For example, the changed power supply voltage may always be supplied to the output node of the transmitter in response to the test mode enable signal, or may be applied to the output node of the transmitter when the voltage level of the changed data is a low level, or may not be applied to the output node of the transmitter when the voltage level of the changed data is a high level, in response to the changed data.

In operation 730, the voltage level of the output node of the transmitter is controlled in response to the changed data.

Here, as described above, a receiver for receiving an output voltage of the transmitter may have a resistance value that varies in response to the test mode enable signal or a test mode disable signal.

Figure 8:
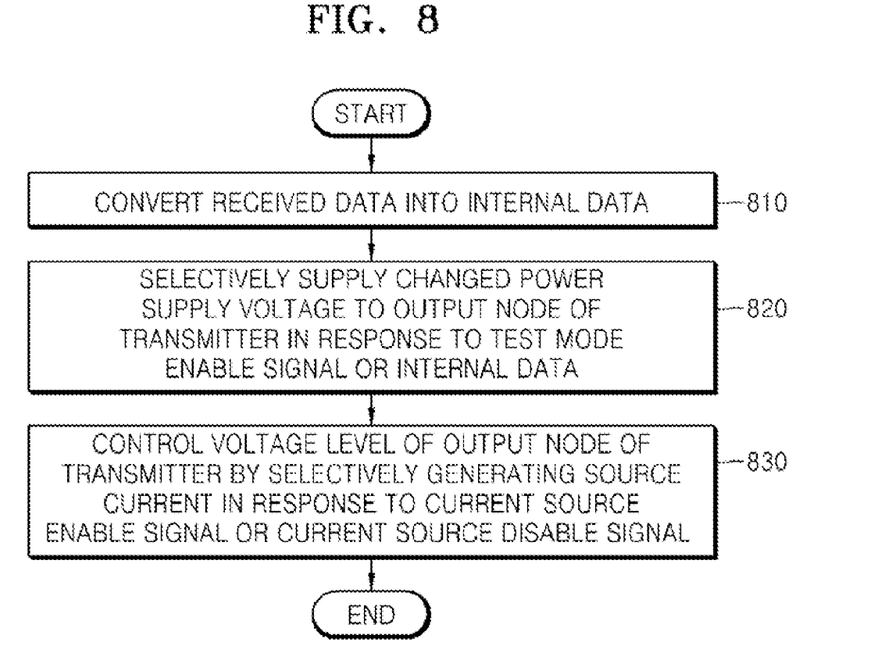
FIG. 8 is a flowchart of a method of controlling an output voltage of a transmitter, according to another embodiment of the invention.

FIG. 8 is a flowchart of a method of controlling an output voltage of a transmitter, according to another embodiment of the invention.

In operation 810, received data is converted into internal data.

In operation 820, a changed power supply voltage generated by changing a voltage level of a power supply voltage is selectively supplied to an output node of a transmitter, in response to a test mode enable signal or the internal data.

For example, the changed power supply voltage may always be supplied to the output node of the transmitter in response to the test mode enable signal, or may be applied to the output node of the transmitter when the voltage level of the internal data is a low level or may not be applied to the output node of the transmitter when the voltage level of the internal data is a high level, in response to the internal data.

In operation 830, the voltage level of the output node of the transmitter is controlled by selectively generating a source current in response to a current source enable signal or a current source disable signal.

Here, as described above, a receiver for receiving an output voltage of the transmitter has a resistance value that varies in response to the test mode enable signal or a test mode disable signal.

Embodiments of the invention can be written as computer programs and can be implemented in general-use digital computers that execute the programs using a computer readable recording medium.

Examples of the computer readable recording medium include magnetic storage media (e.g., ROM, floppy disks, hard disks, etc.), optical recording media (e.g., CD-ROMs, or DVDs), and storage media (e.g., transmission through the Internet).

While the invention has been particularly shown and described with reference to exemplary embodiments thereof, it will be understood that various changes in form and details may be made therein without departing from the spirit and scope of the following claims.

What is claimed is:

1. A transceiver comprising:
a transmitter; and
a receiver for receiving an output voltage of a transmitter, wherein the transmitter comprises:
    a first signal converter for receiving data and outputting changed data generated by changing a voltage level of the received data in response to a mode control signal for selecting a test mode or a normal mode;
    an output voltage control circuit for controlling a voltage level of an output node of the transmitter in response to the changed data; and
    a first termination circuit for supplying to the output node of the transmitter a changed power supply voltage in response to a test mode enable signal or the changed data, and
the receiver comprises a second termination circuit that operates as a resistor having a resistance value that varies in response to receiving one of the test mode enable signal and a test mode disable signal.

2. The transceiver of claim 1, wherein the transmitter further comprises a mode control signal generator for generating the mode control signal, wherein the mode control signal generator comprises:
    a second signal converter for receiving the mode control signal and an input voltage, and for outputting a changed input voltage generated by changing a voltage level of the input voltage in response to the mode control signal;
    a current source circuit for generating a source current in response to the changed input voltage;
    a third termination circuit connected to the current source circuit through a connection node, and supplies the changed power supply voltage to the connection node in response to the test mode enable signal; and
    a comparator that outputs the mode control signal by comparing a voltage of the connection node and a reference voltage.

3. The transceiver of claim 1, wherein the transmitter further comprises a varying power supply voltage generator connected to the first termination circuit through a connection node, and generates the changed power supply voltage, wherein the varying power supply voltage generator comprises:
    a comparator that outputs a result of comparing a voltage of the connection node and a reference voltage; and
    a MOS transistor having a gate to which the result is applied, a first terminal connected to the power supply voltage, and a second terminal connected to the connection node.

4. The transceiver of claim 3, wherein the transmitter further comprises a supply voltage control circuit that includes a voltage determiner that determines a voltage level of the test mode enable signal corresponding to the voltage level of a final voltage of the connection node, and a voltage supplier that generates the reference voltage having a positive voltage level and the test mode enable signal having a negative voltage level in response to the determination of the voltage determiner.

5. The transceiver of claim 1, wherein the first signal converter comprises:
   a buffer for converting the received data into the changed data; and
   a MOS transistor having a gate to which the mode control signal is applied, a first terminal connected to the power supply voltage, and a second terminal connected to the buffer.

6. The transceiver of claim 1, wherein the output voltage control circuit comprises:
   a MOS transistor having a gate to which the changed data is applied, a first terminal to which a ground power source is applied, and a second terminal; and
   the first resistor connected to the second terminal of the MOS transistor and the first termination circuit.

7. The transceiver of claim 1, wherein the first termination circuit comprises:
   a mode selector that outputs the test mode enable signal or the changed data in response to a mode select signal;
   a MOS transistor that has a gate to which the test mode enable signal or the changed data is applied, a first terminal connected to the changed power supply voltage, and a second terminal; and
   a second resistor connected to the second terminal of the MOS transistor and the current source circuit,
   wherein said MOS transistor is turned on in response to the test mode enable signal and when the changed data has a low voltage level, and said MOS transistor is turned when the changed data has a high voltage level.

8. The transceiver of claim 1, wherein said second termination circuit of said receiver comprises a mode selector and a resistance controller that controls resistance of a plurality of transistors of the second termination circuit in response to one of the test mode enable signal or test mode disable signal received from said mode selector.

9. The transceiver of claim 8, wherein the receiver further comprises sub varying power supply voltage generator that supplies a changes power supply voltage to said plurality of transistors of the second termination circuit.

10. A transceiver comprising:
    a transmitter; and
    a receiver for receiving an output voltage of the transmitter, wherein the transmitter comprises:
       a first buffer for receiving data and converting data into internal data;
       a first termination circuit that operates as a resistor connected to an output node of the transmitter in response to the internal data;
       a second termination circuit for supplying to the output node of the transmitter a changed power supply voltage, in response to a test mode enable signal or changed data; and
       a first current source circuit connected to the first termination circuit that generates a source current in response to one of a current source enable signal or a current source disable signal, and
    the receiver comprises a third termination circuit that operates as a resistor having a resistance value that varies in response to one of the test mode enable signal or a test mode disable signal.

11. The transceiver of claim 10, wherein the transmitter further comprises a current source enable signal generator for generating the current source enable signal, wherein the current source enable signal generator comprises:
    a second buffer for converting the received data into the internal data;
    a fourth termination circuit that operates as a resistor in response to the internal data;
    a fifth termination circuit connected to the fourth termination circuit through a connection node for supplying the changed power supply voltage to the connection node in response to the test mode enable signal;
    a second current source circuit connected to the fourth termination circuit for generating a source current in response to a current source enable signal; and
    a comparator that outputs the current source enable signal by comparing a voltage of the connection node and a reference voltage.

12. The transceiver of claim 10, wherein the first current source circuit comprises:
    a mode selector that outputs one of the current source enable signal or the current source disable signal in response to the mode select signal; and
    a MOS transistor having a gate to which the current source enable signal or the current source disable signal is applied, a first terminal connected to the second termination circuit, and the second terminal connected to a ground power source.

13. The transceiver of claim 10, wherein the transmitter further comprises a varying power supply voltage generator connected to the second termination circuit through a connection node for generating the changed power supply voltage, wherein the varying power supply voltage generator comprises:
    a comparator that outputs a result of comparing a voltage of the connection node and a reference voltage; and
    a MOS transistor having a gate to which the result is applied, a first terminal connected to the power supply voltage, and a second terminal connected to the connection node.

14. The transceiver of claim 10, wherein the first termination circuit is turned off in response to the internal data.

15. The transceiver of claim 10, wherein the second termination circuit is turned off in response to the internal data.

16. A method of controlling an output voltage of a transmitter, the method comprising:
    outputting changed data generated by changing a voltage level of received data, in response to a mode control signal for determining one of a test mode or a normal mode;
    selectively supplying to an output node of the transmitter a changed power supply voltage generated by changing a voltage level of a power supply voltage, in response to a test mode enable signal or the changed data; and
    controlling a voltage level of the output node of the transmitter in response to the changed data,
    wherein a receiver for receiving an output voltage of the transmitter has a resistance value that changes in response to one of the test mode enable signal or a test mode disable signal.

* * * * *